US012561658B2

(12) United States Patent
Jain

(10) Patent No.: US 12,561,658 B2
(45) Date of Patent: Feb. 24, 2026

(54) INTEROPERABLE SYSTEM, METHOD, AND COMPUTER PROGRAM PRODUCT FOR DISPENSING FUNDS

(71) Applicant: Visa International Service Association, San Francisco, CA (US)

(72) Inventor: Ranveer Raj Jain, Dubai (AE)

(73) Assignee: Visa International Service Association, San Francisco, CA (US)

( * ) Notice: Subject to any disclaimer, the term of this patent is extended or adjusted under 35 U.S.C. 154(b) by 50 days.

(21) Appl. No.: 18/133,026

(22) Filed: Apr. 11, 2023

(65) Prior Publication Data

US 2024/0346474 A1    Oct. 17, 2024

(51) Int. Cl.
 *G06Q 20/10* (2012.01)
 *G06Q 20/20* (2012.01)
 *G06Q 20/32* (2012.01)
 *G06Q 20/40* (2012.01)

(52) U.S. Cl.
 CPC ......... *G06Q 20/1085* (2013.01); *G06Q 20/20* (2013.01); *G06Q 20/326* (2020.05); *G06Q 20/4014* (2013.01)

(58) Field of Classification Search
 CPC ..................................................... G06Q 40/00
 USPC ......................................................... 705/35
 See application file for complete search history.

(56) References Cited

U.S. PATENT DOCUMENTS

| | | | | |
|---|---|---|---|---|
| 5,237,159 A | * | 8/1993 | Stephens ................ | G06Q 40/02 |
| | | | | 705/45 |
| 5,265,007 A | * | 11/1993 | Barnhard, Jr. ....... | G06Q 20/023 |
| | | | | 705/45 |
| 5,484,988 A | * | 1/1996 | Hills ...................... | G06Q 20/04 |
| | | | | 235/379 |
| 5,691,524 A | * | 11/1997 | Josephson ............ | G06Q 20/102 |
| | | | | 705/40 |

(Continued)

FOREIGN PATENT DOCUMENTS

CN        105096474 A      11/2015

OTHER PUBLICATIONS

"Cardless Cash Withdrawal—Self—ICICI Bank", ICICI Bank, pp. 1-4, retrieved from https://www.icicibank.com/mobile-banking/cardless-cash-withdrawal-self.page, [Accessed Feb. 6, 2023].

(Continued)

*Primary Examiner* — Kirsten S Apple
(74) *Attorney, Agent, or Firm* — The Webb Law Firm

(57) ABSTRACT

A method for dispensing funds including receiving a withdrawal initiation request generated by a user device of a user, generating an authentication code associated with the withdrawal initiation request, receiving a withdrawal completion request from at least one of an automated teller machine (ATM) and/or a merchant point-of-sale (POS) device, validating the withdrawal completion, identifying an issuer system associated with the withdrawal completion request, generating an authorization request, transmitting the authorization request to the issuer system, receiving an authorization response, and transmitting a cash dispense message to (Continued)

cause the at least one of the ATM and/or the merchant POS device to dispense the withdrawal amount. Systems and computer program products for dispensing funds are also disclosed.

15 Claims, 7 Drawing Sheets

(56) References Cited

U.S. PATENT DOCUMENTS

| | | | | |
|---|---|---|---|---|
| 5,717,868 | A * | 2/1998 | James | G06Q 20/10 |
| | | | | 705/35 |
| 5,783,808 | A * | 7/1998 | Josephson | G06Q 20/14 |
| | | | | 235/379 |
| 5,910,989 | A * | 6/1999 | Naccache | G06Q 20/341 |
| | | | | 713/180 |
| 5,983,197 | A * | 11/1999 | Enta | G07F 19/20 |
| | | | | 705/16 |
| 6,016,484 | A * | 1/2000 | Williams | G06Q 20/02 |
| | | | | 235/375 |
| 6,164,528 | A * | 12/2000 | Hills | G06Q 20/04 |
| | | | | 235/379 |
| 6,189,785 | B1 * | 2/2001 | Lowery | G06Q 20/042 |
| | | | | 705/45 |
| 6,193,152 | B1 * | 2/2001 | Fernando | G06Q 20/40145 |
| | | | | 235/383 |
| 6,230,148 | B1 * | 5/2001 | Pare, Jr. | H04L 63/0823 |
| | | | | 705/40 |
| 6,328,207 | B1 * | 12/2001 | Gregoire | G06Q 20/305 |
| | | | | 705/45 |
| 6,581,042 | B2 * | 6/2003 | Pare, Jr. | G06F 21/554 |
| | | | | 705/40 |
| 6,644,546 | B2 * | 11/2003 | George | G06Q 20/042 |
| | | | | 705/42 |
| 6,662,166 | B2 * | 12/2003 | Pare, Jr. | G06Q 20/18 |
| | | | | 705/72 |
| 6,950,810 | B2 * | 9/2005 | Lapsley | G06Q 20/367 |
| | | | | 705/64 |
| 6,970,855 | B2 * | 11/2005 | Das | G06Q 10/08345 |
| | | | | 705/16 |
| 7,099,845 | B2 * | 8/2006 | Higgins | G06Q 20/0425 |
| | | | | 705/45 |
| 7,216,800 | B1 * | 5/2007 | Ramachandran | G06Q 20/425 |
| | | | | 235/379 |
| 7,359,880 | B2 * | 4/2008 | Abel | G06Q 20/108 |
| | | | | 705/40 |
| 7,430,537 | B2 * | 9/2008 | Templeton | G06Q 40/12 |
| | | | | 705/40 |
| 8,157,164 | B1 * | 4/2012 | Billman | G07F 19/203 |
| | | | | 235/375 |
| 9,558,636 | B1 * | 1/2017 | Burdick | H04W 12/068 |
| 10,354,246 | B1 | 7/2019 | Janiga | |
| 10,467,604 | B1 * | 11/2019 | Dorsch | G07F 19/20 |
| 10,475,009 | B2 | 11/2019 | Recriwal et al. | |
| 11,308,481 | B1 * | 4/2022 | Thomas | G06Q 20/4012 |
| 11,610,191 | B1 | 3/2023 | Janiga | |
| 11,948,136 | B1 * | 4/2024 | Thimmareddy | G06Q 20/3224 |
| 12,067,543 | B2 * | 8/2024 | Hill | G07F 19/207 |
| 2002/0004760 | A1 * | 1/2002 | Yoshida | G06Q 20/12 |
| | | | | 705/26.1 |
| 2002/0065774 | A1 * | 5/2002 | Young | G06Q 20/02 |
| | | | | 705/41 |
| 2003/0236746 | A1 * | 12/2003 | Turner | G06Q 20/102 |
| | | | | 705/40 |
| 2004/0143553 | A1 * | 7/2004 | Torget | G06Q 20/042 |
| | | | | 705/66 |
| 2008/0319875 | A1 * | 12/2008 | Levchin | G06Q 40/00 |
| | | | | 705/44 |
| 2012/0197797 | A1 * | 8/2012 | Grigg | G06Q 20/1085 |
| | | | | 705/43 |
| 2014/0156526 | A1 | 6/2014 | Drummond et al. | |
| 2015/0287017 | A1 * | 10/2015 | Iqbal | G06Q 20/3223 |
| | | | | 705/44 |
| 2016/0078417 | A1 * | 3/2016 | DeLuca | G07F 9/001 |
| | | | | 705/43 |
| 2018/0005206 | A1 | 1/2018 | Belin et al. | |
| 2018/0068297 | A1 * | 3/2018 | Goodman | G06Q 40/02 |
| 2018/0165663 | A1 * | 6/2018 | Naik | G06Q 20/3223 |
| 2021/0133710 | A1 | 5/2021 | Kohli et al. | |
| 2022/0051210 | A1 * | 2/2022 | Phillips | G06Q 20/3276 |
| 2024/0193603 | A1 * | 6/2024 | Wolfs | G06Q 20/385 |

OTHER PUBLICATIONS

"Cash Out: Easy cash out via ATM or Bank Transfer", Payit E-Wallet, 2023, pp. 1-3, retrieved from https://payit.ae/services/cash-out/, [Accessed Feb. 6, 2023].
"Introducing mePay Cardless Withdrawal", Emirates NBD, 2023, pp. 1-5, retrieved from https://www.emiratesnbd.com/en/promotions/detailed-page/?id=1555, [Accessed Feb. 6, 2023].

* cited by examiner

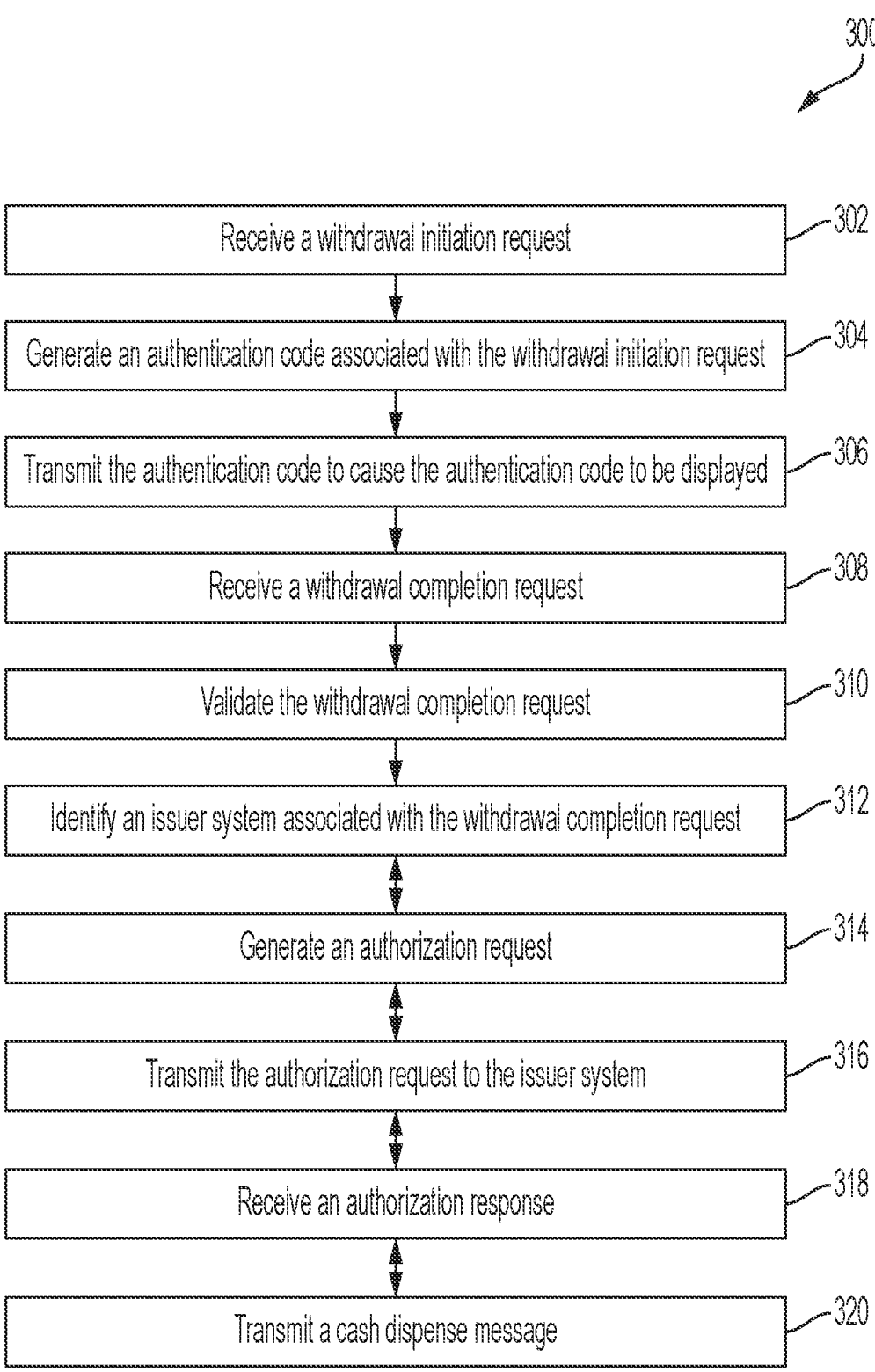

300

Receive a withdrawal initiation request — 302

Generate an authentication code associated with the withdrawal initiation request — 304

Transmit the authentication code to cause the authentication code to be displayed — 306

Receive a withdrawal completion request — 308

Validate the withdrawal completion request — 310

Identify an issuer system associated with the withdrawal completion request — 312

Generate an authorization request — 314

Transmit the authorization request to the issuer system — 316

Receive an authorization response — 318

Transmit a cash dispense message — 320

| Withdrawal Completion Request | |
|---|---|
| Mobile#: | _____ |
| Withdrawal Amount: | _____ |
| Authentication Code: | _____ |
| SUBMIT | |

FIG. 5

INTEROPERABLE SYSTEM, METHOD, AND COMPUTER PROGRAM PRODUCT FOR DISPENSING FUNDS

BACKGROUND

1. Field

This disclosure relates generally to dispensing funds and, in some non-limiting embodiments or aspects, to interoperable methods, systems, and computer program products for dispensing funds.

2. Technical Considerations

Banks offer cash withdrawal services to its consumers at their proprietary automated teller machines (ATMs). In some cases, the services may involve the bank's mobile application without the consumer's payment device linked to the bank being presented. However, such ease of cardless cash withdrawals from ATMs limit consumers to using only that bank's ATMs. Further, the ease of using ATMs without a payment device increases vulnerabilities for fraud. Therefore, it is becoming more important to enable funds to be dispensed at an ATM of a different bank without presenting a payment device, while still protecting the user from fraud.

SUMMARY

Accordingly, and generally, provided is an improved and interoperable method, system, and computer program product for dispensing funds.

According to some non-limiting embodiments or aspects, provided is a method including: receiving, with at least one processor, a withdrawal initiation request generated by a user device of a user, the withdrawal initiation request including data fields containing a withdrawal amount and a user identifier associated with the user; in response to receiving the withdrawal initiation request, generating, with at least one processor, an authentication code associated with the withdrawal initiation request; transmitting, with at least one processor, the authentication code to cause the authentication code to be displayed by the user device; receiving, with at least one processor, a withdrawal completion request including data fields containing the withdrawal amount, the user identifier, and the authentication code, the withdrawal completion request received from at least one of an automated teller machine (ATM) and/or a merchant point-of-sale device; validating, with at least one processor, the withdrawal completion request by matching the withdrawal amount, the user identifier, and the authentication code from the withdrawal completion request with the withdrawal amount and the user identifier from the withdrawal initiation request and the authentication code associated with the withdrawal initiation request; in response to validating the withdrawal completion request, identifying, with at least one processor, an issuer system associated with the withdrawal completion request based on at least one of the withdrawal amount, the user identifier, and/or the authentication code from the withdrawal completion request; generating, with at least one processor, an authorization request including data fields containing the withdrawal amount and an account identifier associated with an account of the user, the account identifier retrieved based on at least one of the withdrawal amount, the user identifier, and/or the authentication code from the withdrawal completion request; transmitting, with at least one processor, the authorization request to the issuer system to cause the issuer system to generate an authorization decision associated with the withdrawal completion request; receiving, with at least one processor, an authorization response comprising a data field containing the authorization decision including an indicator that the withdrawal completion request is authorized; and based on the indicator, transmitting, with at least one processor, a cash dispense message to cause the at least one of the ATM and/or the merchant point-of-sale device to dispense the withdrawal amount.

In some non-limiting embodiments or aspects, the method may further include, in response to receiving the withdrawal initiation request, tokenizing, with at least one processor, the account identifier; associating, with at least one processor, the tokenized account identifier with at least one of the user identifier and/or the account identifier; in response to receiving the withdrawal completion request, retrieving, with at least one processor, the tokenized account identifier based on the user identifier from the withdrawal completion request; transmitting, with at least one processor, the tokenized account identifier to the at least one of the ATM and/or the merchant point-of-sale device; and generating, with at least one processor, the authorization request by detokenizing the account identifier based on the tokenized account identifier and inserting the retrieved account identifier into a corresponding data field of the authorization request. The withdrawal initiation request may be generated by the user engaging with a mobile application of the issuer system on the user device. The method may further include: generating, with a least one processor, a validation approval message in response to validating the withdrawal completion request; and transmitting, with at least one processor, the validation approval message to the at least one of the ATM and/or the merchant point-of-sale device. The method may further include: receiving, with at least one processor, a cash withdrawal message including the tokenized account identifier from an acquirer system, where the detokenizing the account identifier occurs in response to receiving the cash withdrawal message from the acquirer system. The at least one processor may include a transaction service provider processor. The withdrawal completion request may be received by at least one processor in response to a second user inputting the user identifier, the authentication code, and the withdrawal amount into the at least one of the ATM and/or the merchant point-of-sale device, where the withdrawal amount is dispensed to the second user. The cash dispense message may cause the at least one of the ATM and/or the merchant point-of-sale device to dispense the withdrawal amount in a second country different from a first country in which the withdrawal initiation request was initiated, where the withdrawal amount is dispensed in a currency corresponding to the second country. A unique authentication code may be generated for each withdrawal initiation request generated by the user. The issuer system associated with the withdrawal completion request is different from an issuer system associated with the ATM. The withdrawal initiation request and the withdrawal completion request may be initiated without the user presenting a payment device associated with the account of the user.

According to some non-limiting embodiments or aspects, provided is a system including at least one processor programmed or configured to: receive a withdrawal initiation request generated by a user device of a user, the withdrawal initiation request including data fields containing a withdrawal amount and a user identifier associated with the user; in response to receiving the withdrawal initiation request, generate an authentication code associated with the withdrawal initiation request; transmit the authentication code to cause the authentication code to be displayed by the user device; receive a withdrawal completion request including data fields containing the withdrawal amount, the user identifier, and the authentication code, the withdrawal completion request received from at least one of an automated teller machine (ATM) and/or a merchant point-of-sale device; validate the withdrawal completion request by matching the withdrawal amount, the user identifier, and the authentication code from the withdrawal completion request with the withdrawal amount and the user identifier from the withdrawal initiation request and the authentication code associated with the withdrawal initiation request; in response to validating the withdrawal completion request, identify an issuer system associated with the withdrawal completion request based on at least one of the withdrawal amount, the user identifier, and/or the authentication code from the withdrawal completion request; generate an authorization request including data fields containing the withdrawal amount and an account identifier associated with an account of the user, the account identifier retrieved based on at least one of the withdrawal amount, the user identifier, and/or the authentication code from the withdrawal completion request; transmit the authorization request to the issuer system to cause the issuer system to generate an authorization decision associated with the withdrawal completion request; receive an authorization response including a data field containing the authorization decision including an indicator that the withdrawal completion request is authorized; and based on the indicator, transmit a cash dispense message to cause the at least one of the ATM and/or the merchant point-of-sale device to dispense the withdrawal amount.

In some non-limiting embodiments or aspects, the at least one processor may be further programmed or configured to: in response to receiving the withdrawal initiation request, tokenize the account identifier; associate the tokenized account identifier with at least one of the user identifier and/or the account identifier; in response to receiving the withdrawal completion request, retrieve the tokenized account identifier based on the user identifier from the withdrawal completion request; transmit the tokenized account identifier to the at least one of the ATM and/or the merchant point-of-sale device; and generate the authorization request by detokenizing the account identifier based on the tokenized account identifier and inserting the retrieved account identifier into a corresponding data field of the authorization request. The withdrawal initiation request may be generated by the user engaging with a mobile application of the issuer system on the user device. The at least one processor may be further programed or configured to: generate a validation approval message in response to validating the withdrawal completion request; and transmit the validation approval message to the at least one of the ATM and/or the merchant point-of-sale device. The at least one processor may be further programmed or configured to: receive a cash withdrawal message including the tokenized account identifier from an acquirer system, where the detokenizing the account identifier occurs in response to receiving the cash withdrawal message from the acquirer system. The at least one processor may be a transaction service provider processor. The withdrawal completion request may be received by at least one processor in response to a second user inputting the user identifier, the authentication code, and the withdrawal amount into the at least one of the ATM and/or the merchant point-of-sale device, where the withdrawal amount is dispensed to the second user. The cash dispense message may cause the at least one of the ATM and/or the merchant point-of-sale device to dispense the withdrawal amount in a second country different from a first country in which the withdrawal initiation request was initiated, where the withdrawal amount is dispensed in a currency corresponding to the second country. A unique authentication code may be generated for each withdrawal initiation request generated by the user. The issuer system associated with the withdrawal completion request may be different from an issuer system associated with the ATM. The withdrawal initiation request and the withdrawal completion request may be initiated without the user presenting a payment device associated with the account of the user.

According to some non-limiting embodiments or aspects, provided is a computer program product including at least one non-transitory computer-readable medium including one or more instructions that, when executed by at least one processor, causes the at least one processor to: receive a withdrawal initiation request generated by a user device of a user, the withdrawal initiation request including data fields containing a withdrawal amount and a user identifier associated with the user; in response to receiving the withdrawal initiation request, generate an authentication code associated with the withdrawal initiation request; transmit the authentication code to cause the authentication code to be displayed by the user device; receive a withdrawal completion request including data fields containing the withdrawal amount, the user identifier, and the authentication code, the withdrawal completion request received from at least one of an automated teller machine (ATM) and/or a merchant point-of-sale device; validate the withdrawal completion request by matching the withdrawal amount, the user identifier, and the authentication code from the withdrawal completion request with the withdrawal amount and the user identifier from the withdrawal initiation request and the authentication code associated with the withdrawal initiation request; in response to validating the withdrawal completion request, identify an issuer system associated with the withdrawal completion request based on at least one of the withdrawal amount, the user identifier, and/or the authentication code from the withdrawal completion request; generate an authorization request including data fields containing the withdrawal amount and an account identifier associated with an account of the user, the account identifier retrieved based on at least one of the withdrawal amount, the user identifier, and/or the authentication code from the withdrawal completion request; transmit the authorization request to the issuer system to cause the issuer system to generate an authorization decision associated with the withdrawal completion request; receive an authorization response including a data field containing the authorization decision including an indicator that the withdrawal completion request is authorized; and based on the indicator, transmit a cash dispense message to cause the at least one of the ATM and/or the merchant point-of-sale device to dispense the withdrawal amount.

In some non-limiting embodiments or aspects, the computer program product may further cause the at least one processor to: in response to receiving the withdrawal initiation request, tokenize the account identifier; associate the tokenized account identifier with at least one of the user identifier and/or the account identifier; in response to receiving the withdrawal completion request, retrieve the tokenized account identifier based on the user identifier from the withdrawal completion request; transmit the tokenized account identifier to the at least one of the ATM and/or the merchant point-of-sale device; and generate the authorization request by detokenizing the account identifier based on the tokenized account identifier and inserting the retrieved account identifier into a corresponding data field of the authorization request. The withdrawal initiation request may be generated by the user engaging with a mobile application of the issuer system on the user device. The at least one processor may be further programed or configured to: generate a validation approval message in response to validating the withdrawal completion request; and transmit the validation approval message to the at least one of the ATM and/or the merchant point-of-sale device. The computer program product may further cause the at least one processor to: receive a cash withdrawal message including the tokenized account identifier from an acquirer system, where the detokenizing the account identifier occurs in response to receiving the cash withdrawal message from the acquirer system. The at least one processor may be a transaction service provider processor. The withdrawal completion request may be received by at least one processor in response to a second user inputting the user identifier, the authentication code, and the withdrawal amount into the at least one of the ATM and/or the merchant point-of-sale device, where the withdrawal amount is dispensed to the second user. The cash dispense message may cause the at least one of the ATM and/or the merchant point-of-sale device to dispense the withdrawal amount in a second country different from a first country in which the withdrawal initiation request was initiated, where the withdrawal amount is dispensed in a currency corresponding to the second country. A unique authentication code may be generated for each withdrawal initiation request generated by the user. The issuer system associated with the withdrawal completion request may be different from an issuer system associated with the ATM. The withdrawal initiation request and the withdrawal completion request may be initiated without the user presenting a payment device associated with the account of the user.

Further non-limiting embodiments or aspects are set forth in the following numbered clauses:

Clause 1: A computer-implemented method comprising: receiving, with at least one processor, a withdrawal initiation request generated by a user device of a user, the withdrawal initiation request comprising data fields containing a withdrawal amount and a user identifier associated with the user; in response to receiving the withdrawal initiation request, generating, with at least one processor, an authentication code associated with the withdrawal initiation request; transmitting, with at least one processor, the authentication code to cause the authentication code to be displayed by the user device; receiving, with at least one processor, a withdrawal completion request comprising data fields containing the withdrawal amount, the user identifier, and the authentication code, the withdrawal completion request received from at least one of an automated teller machine (ATM) and/or a merchant point-of-sale device; validating, with at least one processor, the withdrawal completion request by matching the withdrawal amount, the user identifier, and the authentication code from the withdrawal completion request with the withdrawal amount and the user identifier from the withdrawal initiation request and the authentication code associated with the withdrawal initiation request; in response to validating the withdrawal completion request, identifying, with at least one processor, an issuer system associated with the withdrawal completion request based on at least one of the withdrawal amount, the user identifier, and/or the authentication code from the withdrawal completion request; generating, with at least one processor, an authorization request comprising data fields containing the withdrawal amount and an account identifier associated with an account of the user, the account identifier retrieved based on at least one of the withdrawal amount, the user identifier, and/or the authentication code from the withdrawal completion request; transmitting, with at least one processor, the authorization request to the issuer system to cause the issuer system to generate an authorization decision associated with the withdrawal completion request; receiving, with at least one processor, an authorization response comprising a data field containing the authorization decision comprising an indicator that the withdrawal completion request is authorized; and based on the indicator, transmitting, with at least one processor, a cash dispense message to cause the at least one of the ATM and/or the merchant point-of-sale device to dispense the withdrawal amount.

Clause 2: The computer-implemented method of clause 1, further comprising: in response to receiving the withdrawal initiation request, tokenizing, with at least one processor, the account identifier; associating, with at least one processor, the tokenized account identifier with at least one of the user identifier and/or the account identifier; in response to receiving the withdrawal completion request, retrieving, with at least one processor, the tokenized account identifier based on the user identifier from the withdrawal completion request; transmitting, with at least one processor, the tokenized account identifier to the at least one of the ATM and/or the merchant point-of-sale device; and generating, with at least one processor, the authorization request by detokenizing the account identifier based on the tokenized account identifier and inserting the retrieved account identifier into a corresponding data field of the authorization request.

Clause 3: The computer-implemented method of clause 1 or 2, wherein the withdrawal initiation request is generated by the user engaging with a mobile application of the issuer system on the user device.

Clause 4: The computer-implemented method of any of clauses 1-3, further comprising: generating, with a least one processor, a validation approval message in response to validating the withdrawal completion request; and transmitting, with at least one processor, the validation approval message to the at least one of the ATM and/or the merchant point-of-sale device.

Clause 5: The computer-implemented method of any of clauses 1-4, further comprising: receiving, with at least one processor, a cash withdrawal message comprising the tokenized account identifier from an acquirer system, wherein the detokenizing the account identifier occurs in response to receiving the cash withdrawal message from the acquirer system.

Clause 6: The computer-implemented method of any of clauses 1-5, wherein the at least one processor comprises a transaction service provider processor.

Clause 7: The computer-implemented method of any of clauses 1-6, wherein the withdrawal completion request is received by at least one processor in response to a second user inputting the user identifier, the authentication code, and the withdrawal amount into the at least one of the ATM and/or the merchant point-of-sale device, wherein the withdrawal amount is dispensed to the second user.

Clause 8: The computer-implemented method of any of clauses 1-7, wherein the cash dispense message causes the at least one of the ATM and/or the merchant point-of-sale device to dispense the withdrawal amount in a second country different from a first country in which the withdrawal initiation request was initiated, wherein the withdrawal amount is dispensed in a currency corresponding to the second country.

Clause 9: The computer-implemented method of any of clauses 1-8, wherein a unique authentication code is generated for each withdrawal initiation request generated by the user.

Clause 10: The computer-implemented method of any of clauses 1-9, comprising the ATM, wherein the issuer system associated with the withdrawal completion request is different from an issuer system associated with the ATM.

Clause 11: The computer-implemented method of any of clauses 1-10, wherein the withdrawal initiation request and the withdrawal completion request are initiated without the user presenting a payment device associated with the account of the user.

Clause 12: A system comprising at least one processor programmed or configured to: receive a withdrawal initiation request generated by a user device of a user, the withdrawal initiation request comprising data fields containing a withdrawal amount and a user identifier associated with the user; in response to receiving the withdrawal initiation request, generate an authentication code associated with the withdrawal initiation request; transmit the authentication code to cause the authentication code to be displayed by the user device; receive a withdrawal completion request comprising data fields containing the withdrawal amount, the user identifier, and the authentication code, the withdrawal completion request received from at least one of an automated teller machine (ATM) and/or a merchant point-of-sale device; validate the withdrawal completion request by matching the withdrawal amount, the user identifier, and the authentication code from the withdrawal completion request with the withdrawal amount and the user identifier from the withdrawal initiation request and the authentication code associated with the withdrawal initiation request; in response to validating the withdrawal completion request, identify an issuer system associated with the withdrawal completion request based on at least one of the withdrawal amount, the user identifier, and/or the authentication code from the withdrawal completion request; generate an authorization request comprising data fields containing the withdrawal amount and an account identifier associated with an account of the user, the account identifier retrieved based on at least one of the withdrawal amount, the user identifier, and/or the authentication code from the withdrawal completion request; transmit the authorization request to the issuer system to cause the issuer system to generate an authorization decision associated with the withdrawal completion request; receive an authorization response comprising a data field containing the authorization decision comprising an indicator that the withdrawal completion request is authorized; and based on the indicator, transmit a cash dispense message to cause the at least one of the ATM and/or the merchant point-of-sale device to dispense the withdrawal amount.

Clause 13: The system of clause 12, wherein the at least one processor is further programmed or configured to: in response to receiving the withdrawal initiation request, tokenize the account identifier; associate the tokenized account identifier with at least one of the user identifier and/or the account identifier; in response to receiving the withdrawal completion request, retrieve the tokenized account identifier based on the user identifier from the withdrawal completion request; transmit the tokenized account identifier to the at least one of the ATM and/or the merchant point-of-sale device; and generate the authorization request by detokenizing the account identifier based on the tokenized account identifier and inserting the retrieved account identifier into a corresponding data field of the authorization request.

Clause 14: The system of clause 12 or 13, wherein the withdrawal initiation request is generated by the user engaging with a mobile application of the issuer system on the user device.

Clause 15: The system of any of clauses 12-14, wherein the at least one processor is further programed or configured to: generate a validation approval message in response to validating the withdrawal completion request; and transmit the validation approval message to the at least one of the ATM and/or the merchant point-of-sale device.

Clause 16: The system of any of clauses 12-15, wherein the at least one processor is further programmed or configured to: receive a cash withdrawal message comprising the tokenized account identifier from an acquirer system, wherein the detokenizing the account identifier occurs in response to receiving the cash withdrawal message from the acquirer system.

Clause 17: The system of any of clauses 12-16, wherein the at least one processor comprises a transaction service provider processor.

Clause 18: The system of any of clauses 12-17, wherein the withdrawal completion request is received in response to a second user inputting the user identifier, the authentication code, and the withdrawal amount into the at least one of the ATM and/or the merchant point-of-sale device, wherein the withdrawal amount is dispensed to the second user.

Clause 19: The system of any of clauses 12-18, wherein the cash dispense message causes the at least one of the ATM and/or the merchant point-of-sale device to dispense the withdrawal amount in a second country different from a first country in which the withdrawal initiation request was initiated, wherein the withdrawal amount is dispensed in a currency corresponding to the second country.

Clause 20: The system of any of clauses 12-19, wherein a unique authentication code is generated for each withdrawal initiation request generated by the user.

Clause 21: The system of any of clauses 12-20, comprising the ATM, wherein the issuer system associated with the withdrawal completion request is different from an issuer system associated with the ATM.

Clause 22: The system of any of clauses 12-21, wherein the withdrawal initiation request and the withdrawal completion request are initiated without the user presenting a payment device associated with the account of the user.

Clause 23: A computer program product comprising at least one non-transitory computer-readable medium including one or more instructions that, when executed by at least one processor, causes the at least one processor to: receive a withdrawal initiation request generated by a user device of a user, the withdrawal initiation request comprising data fields containing a withdrawal amount and a user identifier associated with the user; in response to receiving the withdrawal initiation request, generate an authentication code associated with the withdrawal initiation request; transmit the authentication code to cause the authentication code to be displayed by the user device; receive a withdrawal completion request comprising data fields containing the withdrawal amount, the user identifier, and the authentication code, the withdrawal completion request received from at least one of an automated teller machine (ATM) and/or a merchant point-of-sale device; validate the withdrawal completion request by matching the withdrawal amount, the user identifier, and the authentication code from the withdrawal completion request with the withdrawal amount and the user identifier from the withdrawal initiation request and the authentication code associated with the withdrawal initiation request; in response to validating the withdrawal completion request, identify an issuer system associated with the withdrawal completion request based on at least one of the withdrawal amount, the user identifier, and/or the authentication code from the withdrawal completion request; generate an authorization request comprising data fields containing the withdrawal amount and an account identifier associated with an account of the user, the account identifier retrieved based on at least one of the withdrawal amount, the user identifier, and/or the authentication code from the withdrawal completion request; transmit the authorization request to the issuer system to cause the issuer system to generate an authorization decision associated with the withdrawal completion request; receive an authorization response comprising a data field containing the authorization decision comprising an indicator that the withdrawal completion request is authorized; and based on the indicator, transmit a cash dispense message to cause the at least one of the ATM and/or the merchant point-of-sale device to dispense the withdrawal amount.

Clause 24: The computer program product of clause 23, further causing the at least one processor to: in response to receiving the withdrawal initiation request, tokenize the account identifier; associate the tokenized account identifier with at least one of the user identifier and/or the account identifier; in response to receiving the withdrawal completion request, retrieve the tokenized account identifier based on the user identifier from the withdrawal completion request; transmit the tokenized account identifier to the at least one of the ATM and/or the merchant point-of-sale device; and generate the authorization request by detokenizing the account identifier based on the tokenized account identifier and inserting the retrieved account identifier into a corresponding data field of the authorization request.

Clause 25: The computer program product of clause 23 or 24, wherein the withdrawal initiation request is generated by the user engaging with a mobile application of the issuer system on the user device.

Clause 26: The computer program product of any of clauses 23-25, wherein the at least one processor is further programed or configured to: generate a validation approval message in response to validating the withdrawal completion request; and transmit the validation approval message to the at least one of the ATM and/or the merchant point-of-sale device.

Clause 27: The computer program product of any of clauses 23-26, further causing the at least one processor to: receive a cash withdrawal message comprising the tokenized account identifier from an acquirer system, wherein the detokenizing the account identifier occurs in response to receiving the cash withdrawal message from the acquirer system.

Clause 28: The computer program product of any of clauses 23-27, wherein the at least one processor comprises a transaction service provider processor.

Clause 29: The computer program product of any of clauses 23-28, wherein the withdrawal completion request is received in response to a second user inputting the user identifier, the authentication code, and the withdrawal amount into the at least one of the ATM and/or the merchant point-of-sale device, wherein the withdrawal amount is dispensed to the second user.

Clause 30: The computer program product of any of clauses 23-29, wherein the cash dispense message causes the at least one of the ATM and/or the merchant point-of-sale device to dispense the withdrawal amount in a second country different from a first country in which the withdrawal initiation request was initiated, wherein the withdrawal amount is dispensed in a currency corresponding to the second country.

Clause 31: The computer program product of any of clauses 23-30, wherein a unique authentication code is generated for each withdrawal initiation request generated by the user.

Clause 32: The computer program product of any of clauses 23-31, comprising the ATM, wherein the issuer system associated with the withdrawal completion request is different from an issuer system associated with the ATM.

Clause 33: The computer program product of any of clauses 23-32, wherein the withdrawal initiation request and the withdrawal completion request are initiated without the user presenting a payment device associated with the account of the user.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 3 shows a process flow of a method that enables interoperable dispensing of funds, according to some non-limiting embodiments or aspects;

FIG. 5 shows a schematic of a graphical user interface for requesting completion of a withdrawal of funds;

DETAILED DESCRIPTION

Figure 1:
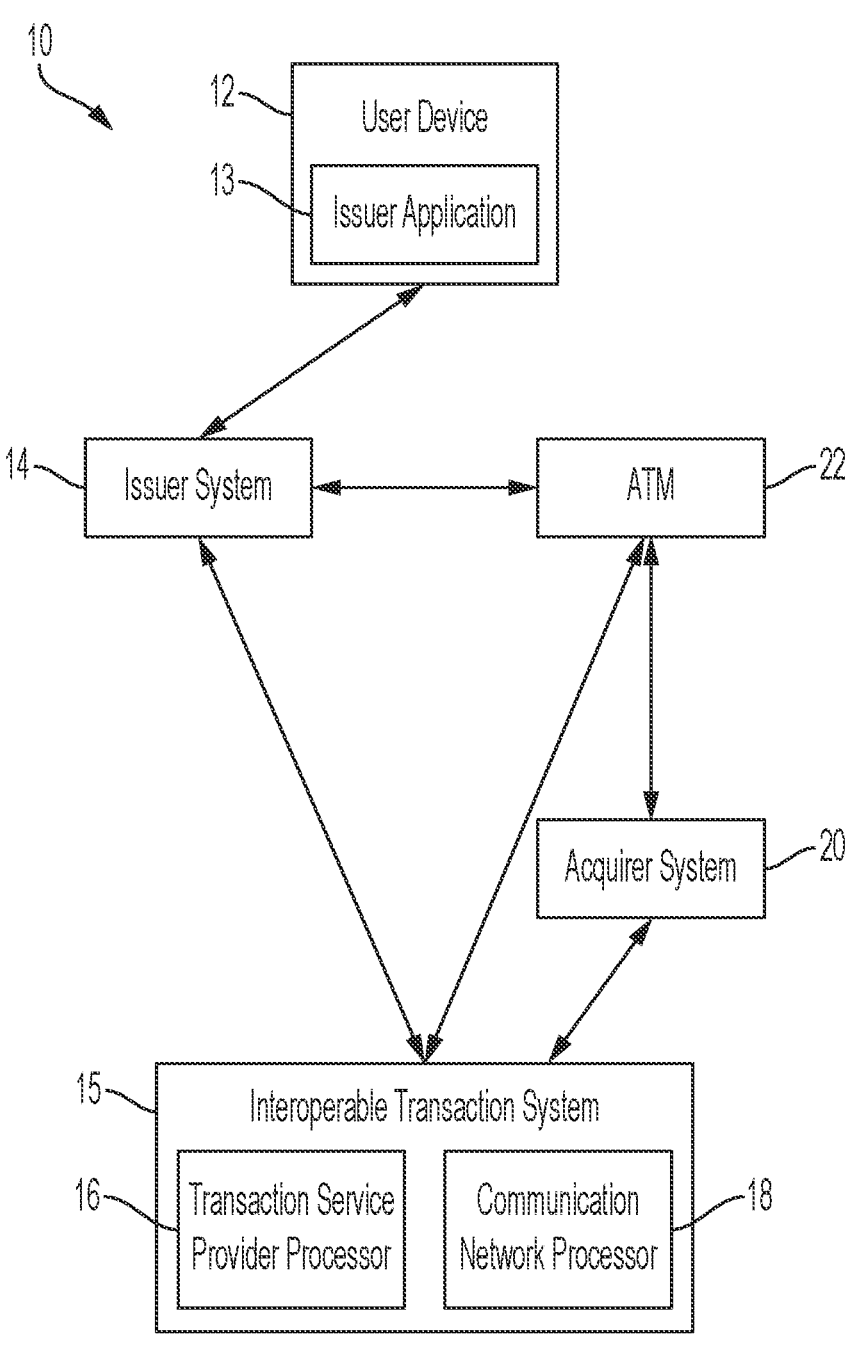
FIG. 1 shows a schematic diagram of an interoperable system for dispensing funds, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may include one or more primary account numbers (PAN), tokens, or other identifiers associated with a customer account. For example, account identifiers in Real Time Payment (RTP) transactions may include identifiers for sender accounts (called debtor accounts) and identifiers for receiver accounts (called creditor accounts). Account identifiers may be alphanumeric or any combination of characters and/or symbols. Tokens may be associated with a PAN, debtor account identifier, creditor account identifier, or other original account identifier in one or more data structures (e.g., one or more databases, and/or the like) such that they may be used to conduct a transaction without directly using the original account identifier. In some examples, an original account identifier may be associated with a plurality of tokens for different individuals or purposes.

As used herein, the term "acquirer" "acquirer system", "acquirer institution" or "acquirer bank" may refer to one or more entities licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "card-present transaction" may refer to a payment transaction initiated with a payment device in which the cardholder physically presents the payment device at the time the payment transaction is initiated with the payment device. A non-limiting example of a card-present transaction is a payment transaction initiated at a brick-and-mortar retail store with a physical point-of-sale (POS) system, during which the cardholder physically presents the payment device to the merchant.

As used herein, the term "card-not-present transaction" or "CNP transaction" may refer to a payment transaction initiated with a payment device in which the cardholder does not or cannot physically present the payment device at the time the payment transaction is initiated with the payment device. Non-limiting examples of CNP transactions include transactions initiated by mail or facsimile or a payment transaction initiated over the telephone or the internet.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer.

As used herein, the term "issuer,", "issuer system" "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Some non-limiting embodiments or aspects are described herein in connection with interoperable systems, methods, and computer program products for dispensing funds.

Non-limiting embodiments or aspects improve existing systems for automatically dispensing funds. In existing systems, a user is only able to retrieve funds in an automated teller machine (ATM) transaction in which the user does not present the payment device to the ATM by using an ATM in the issuer's network. Non-limiting embodiments or aspects enable a user to conduct ATM transactions in which the user does not present the payment device to the ATM without being limited to using the issuer's ATM. The user is able to retrieve funds dispensed by ATMs of other issuers, including dispensing funds from ATMs located in other countries. Further, non-limiting embodiments or aspects improve the security of transactions in which funds are dispersed by preventing fraudulent transactions while still enabling non-fraudulent transactions.

Non-limiting embodiments or aspects of the present disclosure are directed to an interoperable method, system, and computer program product for automatically dispensing funds. Non-limiting embodiments or aspects enable a user to retrieve funds from ATMs or participating merchants without a physical payment device (e.g., debit or credit card) from an issuer institution being presented to initiate the transaction, thereby allowing a cardless transaction. A user is enabled to retrieve funds from ATMs of third party institutions or participating merchants, which did not issue the physical payment device to the user. These features may be enabled by the unique system arrangement in which the interoperable transaction processing system of the transaction service provider integrates with the network of a plurality of different issuers to process transactions to dispense funds at the ATM or merchant point-of-sale. In response to receiving a withdrawal initiation request, the transaction processing system may generate an authentication code which may be used to validate the identity of the user when the user initiates the withdrawal completion request at an ATM (even an ATM not associated with the issuer) without presentation of the user's payment device. The interoperable system determines the issuer system associated with the user after initiation of the withdrawal completion request and communicates an authorization request to the relevant issuer system to request authorization to dispense the funds to the user at an ATM or merchant location not associated with the issuer. Further, a user (the same or different from the initial user) is enabled to retrieve funds from ATMs of other countries due to the interoperable nature of the system described herein. Practically, this allows the user to retrieve funds from any ATMs or participating merchants across the world without presenting a physical payment device.

Referring to FIG. 1, an interoperable system 10 for automatically dispensing of funds, according to some non-limiting embodiments or aspects, is shown. The system 10 may include a user device 12 (e.g., associated with a user engaging in a transaction involving the dispensing of funds from an ATM or a point-of-sale device of participating merchants). The user device 12 may be a client device, such as a smartphone, a tablet computer, and/or the like. The user device 12 may include an issuer application 13 downloaded and/or installed on the user device 12. The user device 12 may be in communication with an issuer system 14. The issuer system 14 may be operated by or on behalf of the issuer that issued a payment device of the user that was used to initiate the fund-dispensing transaction, and the issuer application 13 may be a mobile application of the issuer. The user device 12 may be in communication with the issuer system 14 via the issuer application 13.

With continued reference to FIG. 1, the system 10 may include the issuer system 14. The issuer system 14 may be operated by or on behalf of issuers of payment devices. The issuer 14 may communicate with the user device 12. The issuer system 14 may communicate with the issuer application 13. The issuer system 14 may communicate with an interoperable transaction system 15. For example, the issuer system 14 may communicate with a transaction service provider processor 16 of the interoperable transaction system 15. The issuer system 14 may communicate with a communication network processor 18 of the interoperable transaction system 15. The issuer system 14 may communicate with an ATM 22.

With continued reference to FIG. 1, the system 10 may include the interoperable transaction system 15. The interoperable transaction system 15 may be operated by or on behalf of a transaction service provider. The interoperable transaction system 15 may include a transaction service provider processor 16 and a communication network processor 18. The interoperable transaction system 15 may communicate with the issuer system 14. The transaction service provider processor 16 may communicate with the issuer system 14. The communication network processor 18 may communicate with the issuer system 14. The interoperable transaction system 15 may communicate with an acquirer system 20. The interoperable transaction system 15 may communicate with an ATM 22. The transaction service provider processor 16 may communicate with the acquirer system 20. The transaction service provider processor 16 may communicate with the ATM 22. The communication network processor 18 may communicate with the acquirer system 20. The communication network processor 18 may communicate with the ATM 22.

With continued reference to FIG. 1, the system 10 may include the acquirer system 20. The acquirer system 20 may be associated with the ATM 22 of the issuer system 14. The acquirer system 20 may communicate with the ATM 22. The ATM 22 may communicate with the issuer system 14. The acquirer system 20 may communicate with the interoperable transaction system 15. The acquirer system 20 may communicate with the transaction service provider processor 16 of the interoperable transaction system 15. The acquirer system 20 may communicate with the communication network processor 18 of the interoperable transaction system 15.

With continued reference to FIG. 1, the system 10 may include the ATM 22. The ATM 22 may be in communication with the issuer system 14, and the ATM 22 may be an ATM of the issuer system 14. The acquirer system 20 may be associated with the ATM 22 to facilitate the ATM's 22 communication with the interoperable transaction system 15. In some non-limiting embodiments or aspects, a participating merchant POS device may be substituted in the place of the ATM 22.

Figure 2:
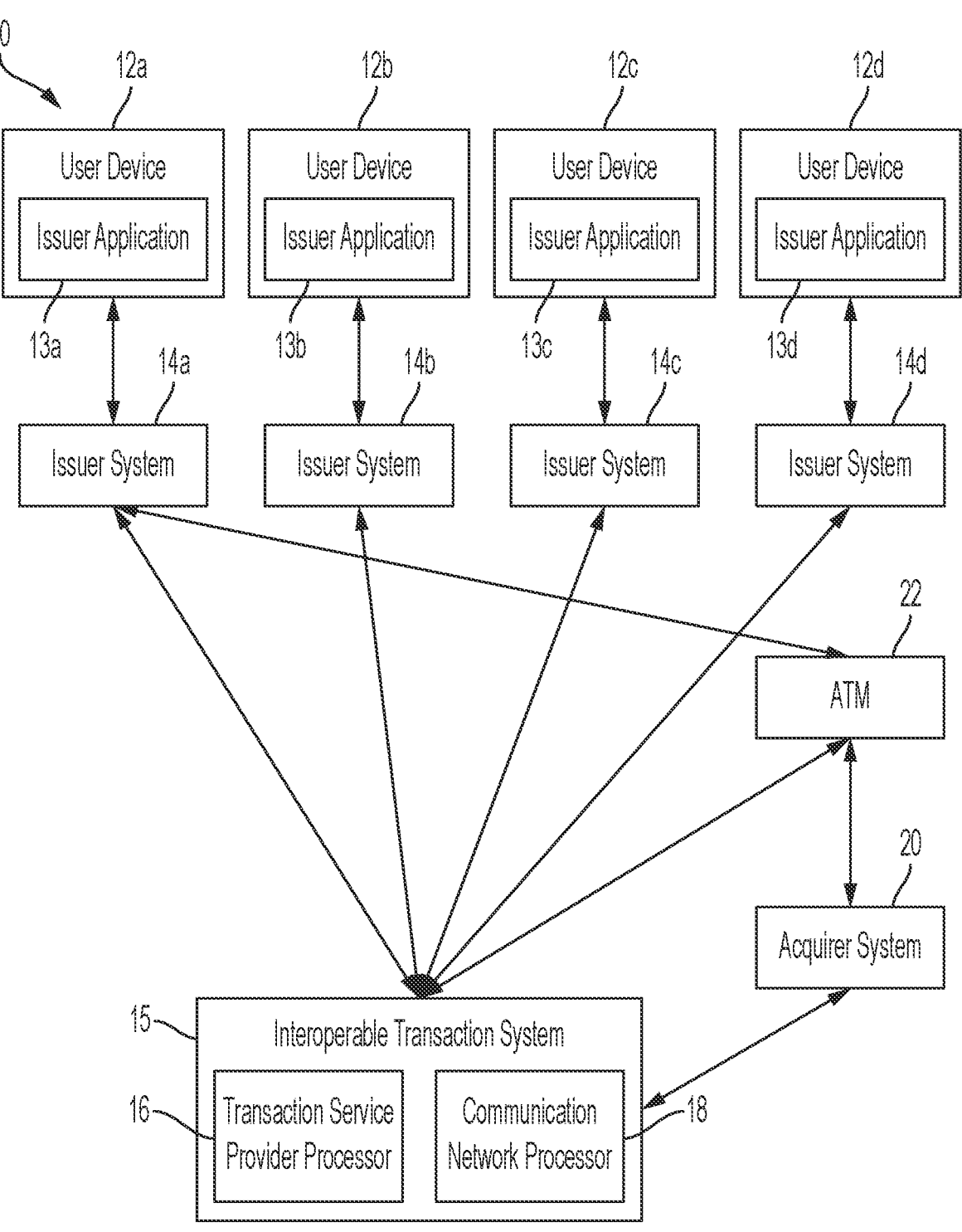
FIG. 2 shows a schematic diagram of an interoperable system for dispensing funds with multiple issuers, according to some non-limiting embodiments or aspects.

Referring to FIG. 2, an interoperable system 10 for automatically dispensing funds, according to some non-limiting embodiments or aspects, is shown. The system 10 may include a plurality of user devices 12a-12d, each associated with a different user. For purposes of illustration, FIG. 2 shows four user devices 12a-12d. It is appreciated that the system 10 may include any number of user devices 12a-12d. Each of the user devices 12a-12d may include an issuer application 13a-13d of a different issuer downloaded and/or installed on the user devices 12a-12d. Each of the user devices 12a-12d may include more than one issuer application 13*a*-13*d*. The user devices 12*a*-12*d* may communicate with a plurality of issuer systems 14*a*-14*d* of different issuers. Thus, in this example, each user has a payment device issued, thereto, by a different issuer. The system 10 may include a plurality of issuer systems 14*a*-14*d*, each associated with a different issuer. For the purpose of illustration, four issuer systems 14*a*-14*d* are shown. It is appreciated that the system 10 may include any number of issuer systems 14*a*-14*d*. Each of the issuer systems 14*a*-14*d* may communicate with the interoperable transaction system 15. Each of the issuer systems 14*a*-14*d* may communicate with the transaction service provider processor 16 of the interoperable transaction system 15. Each of the issuer systems 14*a*-14*d* may communicate with the communication network processor 18 of the interoperable transaction system 15. The issuer system 14*a* may communicate with the ATM 22 and, in this non-limiting example, the issuer of the issuer system 14*a* may also be the issuer of the ATM 22.

Referring to FIG. 3, a method 300 for automatically dispensing funds, according to some non-limiting embodiments or aspects, are shown. At step 302, a withdrawal initiation request is received. The withdrawal initiation request may be received by the interoperable transaction system 15. The withdrawal initiation request may be received by the transaction service provider processor 16 or the communication network processor 18 of the interoperable transaction system 15. The withdrawal initiation request may comprise a user identifier, a user's account number (e.g., a PAN, a card number, a payment card number, and/or the like), and a withdrawal amount. The user identifier may comprise a user's phone number or other identifier uniquely identifying the user. The withdrawal amount may comprise any number value indicating the amount of funds to be dispensed. The withdrawal initiation request may be sent to the interoperable transaction system 15 from the issuer system 14. The issuer system 14 may transmit the withdrawal initiation request to the interoperable transaction system 15 in response to receiving the withdrawal initiation request from the user device 12. The issuer system 14 may receive the withdrawal initiation request from the issuer application 13 of the user device 12. The user device 12 may generate the withdrawal initiation request in response to the user inputting the withdrawal amount and/or the user identifier into the issuer application 13 of the user device 12. The user device 12 may transmit the withdrawal initiation request to the issuer system 14 in response to the user inputting the withdrawal amount and/or the user identifier.

With continued reference to FIG. 3, at step 304, the interoperable transaction system 15 may generate an authentication code associated with the withdrawal initiation request. The interoperable transaction system 15 may generate the authentication code associated with the withdrawal initiation request in response to receiving the withdrawal initiation request. After receiving the withdrawal initiation request, the interoperable transaction system 15 may enroll and store the user identifier, user's account number, and the withdrawal amount. Based on the withdrawal initiation request, the interoperable transaction system 15 may store the account identifier (e.g., a PAN) associated with the user and may tokenize the account identifier. It will be appreciated that the user identifier and the account identifier may be different identifiers, as the user identifier may uniquely identify the user while the account identifier may uniquely identify a payment account of the user. For example, the user identifier may be a user phone number, while the account identifier may be a PAN of the payment account. The interoperable transaction system 15 may associate the authentication code with the user identifier, user's account identifier and the withdrawal amount. The interoperable transaction system may generate a tokenized account identifier using the user's account identifier. A new authentication code may be generated for each time a withdrawal initiation request is received by the interoperable transaction system 15. A new and unique authentication code may be generated for each withdrawal initiation request even if the user identifier, the account identifier, and/or the withdrawal amount are identical in subsequent withdrawal initiation requests.

Figure 4:
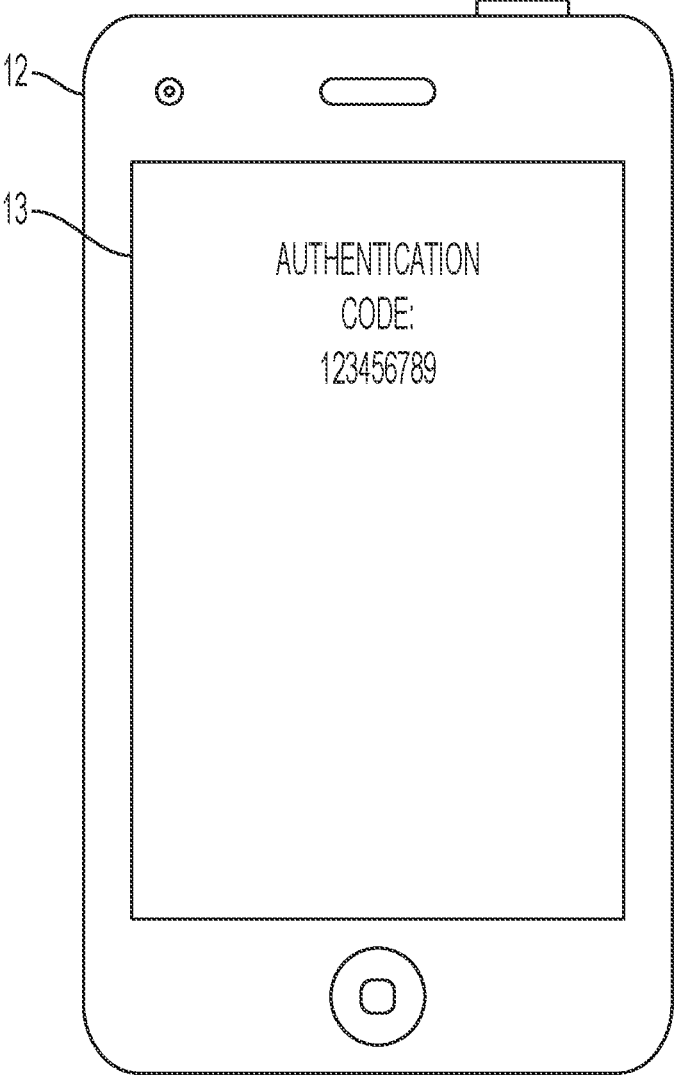
FIG. 4 shows a schematic of a graphical user interface for displaying the authentication code on a user device.

With continued reference to FIG. 3, at step 306, the interoperable transaction system 15 may transmit the authentication code to cause the authentication code to be displayed. The interoperable transaction system 15 may transmit the authentication code to the issuer system 14. In response to receiving the authentication code, the issuer system 14 may transmit the authentication code to the user device 12. The user device 12 may display the authentication code on the issuer application 13 of the user device to be seen by the user. Referring to FIG. 4, a graphical user interface is shown in which the authentication code is shown on the issuer application 13 installed on the user device 12.

With continued reference to FIG. 3, at step 308, the interoperable transaction system 15 may receive a withdrawal completion request. The interoperable transaction system 15 may receive the withdrawal completion request from the ATM 22. The ATM 22 may transmit the withdrawal completion request to the interoperable transaction system 15 in response to the user interacting with the ATM 22. The user may select an option in the ATM 22 or on a POS device of a participating merchant system. The option may allow the user to withdraw cash from the ATM without a physical credit card, debit card, or any physical payment device to identify an account from which the funds will be dispensed.

Referring to FIG. 5, in response to selecting the option, the user may input the authentication code, the user identifier, and the withdrawal amount in the ATM data fields displayed on the ATM 22. The user may be the user or a different second user with knowledge of the authentication code, withdrawal amount, and the user identifier, such as by the user transmitting the authentication code, withdrawal amount, and the user identifier to the second user. The second user may be in a different geographic location, such as a different city, state, and/or country. In response to inputting the authentication code, the user identifier, and the withdrawal amount to the ATM 22, the ATM 22 may generate the withdrawal completion request. The withdrawal completion request may comprise the authentication code, the user identifier, and the withdrawal amount. The ATM 22 and/or the device of the participating merchant system may transmit the withdrawal completion request to the interoperable transaction system 15. The ATM 22 and/or the device of the participating merchant system may transmit the withdrawal completion request to the interoperable transaction system 15 via the acquirer system 20. The ATM 22 may not generate the withdrawal completion request if the user has not input the authentication code, the user identifier, and the withdrawal amount in the ATM 22 within a predetermined amount of time since the authentication code was generated by the interoperable transaction system 15.

With continued reference to FIG. 3, at step 310, the interoperable transaction system 15 may validate the withdrawal completion request. In response to receiving the withdrawal completion request having the authentication code, the user identifier, and the withdrawal amount, the interoperable transaction system 15 may retrieve the enrolled and stored user identifier, the withdrawal amount, and the authentication code that was associated with the user identifier and the withdrawal amount at the withdrawal initiation request. The untokenized or tokenized account identifier may be retrieved by the interoperable transaction system 15 based on the withdrawal completion request. In some non-limiting embodiments or aspects, the tokenized account identifier may be retrieved as to avoid transmitting the untokenized account identifier. The interoperable transaction system 15 may validate the withdrawal completion request by matching the authentication code of the withdrawal completion request and the authentication code of the withdrawal initiation request. The interoperable transaction system 15 may validate the withdrawal completion request by matching the user identifier, the withdrawal amount, and the authentication code associated with the withdrawal completion request with the user identifier, the withdrawal amount, and the authentication code associated with the withdrawal initiation request.

In response to validating the withdrawal completion request, the interoperable transaction system 15 may generate a validation approval message. The interoperable transaction system 15 may transmit the validation approval message to the ATM 22. The validation approval message may contain the tokenized and/or untokenized account identifier. In response to receiving the validation approval message, the ATM 22 may generate a cash withdrawal message. The cash withdrawal message may include the account identifier (tokenized or untokenized), the withdrawal amount, and/or the authentication code. The ATM 22 may transmit the cash withdrawal message to the acquirer system 20. In response to receiving the cash withdrawal message, the acquirer system 20 may transmit the cash withdrawal message to the interoperable transaction system 15.

With continued reference to FIG. 3, at step 312, the interoperable transaction system 15 may identify an issuer system 14 associated with the withdrawal completion request. The interoperable transaction system 15 may identify the issuer system 14 associated with the withdrawal completion request in response to validating the cash withdrawal message. After validating the cash withdrawal message, the interoperable transaction system 15 may identify the issuer system 14 associated with the user identifier. The interoperable transaction system 15 may identify the issuer system 14 associated with the account identifier. The issuer system 14 may be identified in response to receiving the withdrawal completion request and/or in response to receiving the cash withdrawal message. In some embodiments or aspects, the issuer system 14 may be determined based on the PAN. The account identifier (e.g., the PAN) may be tokenized, and the interoperable transaction system 15 may detokenize the account identifier and determine the issuer system 14 based on the detokenized account identifier.

With continued reference to FIG. 3, at step 314, the interoperable transaction system 15 may generate an authorization request. The interoperable transaction system 15 may generate an authorization request in response to determining that the issuer system 14 is associated with the withdrawal completion request. The authorization request may include the withdrawal amount and the account identifier. The interoperable transaction system 15 may detokenize the tokenized account identifier from the cash withdrawal message and insert the detokenized account identifier into the authorization request.

With continued reference to FIG. 3, at step 316, the interoperable transaction system 15 may transmit the authorization request to the issuer system. The interoperable transaction system 15 may transmit the authorization request to the issuer system 14 corresponding to the transaction. Thus, the interoperable transaction system may have identified the issuer system 14 from a plurality of different issuer systems as the issuer system 14 corresponding to the transaction. The issuer system 14 may be different from the issuer system of the ATM 22. The issuer system 14 may generate an authorization response in response to receiving the authorization request. After generating the authorization response, the issuer system 14 may transmit the authorization response to the interoperable transaction system 15. The authorization response may contain an indicator indicating whether the issuer system 14 determined that the transaction was authorized or declined.

With continued reference to FIG. 3, at step 318, the interoperable transaction system 15 may receive an authorization response. In response to receiving the authorization response comprising the indicator that the transaction is authorized, the interoperable transaction system 15 may generate a cash dispense message. In response to receiving the authorization response comprising the indicator that the transaction is declined, the interoperable transaction system 15 may generate a termination message to terminate the transaction.

With continued reference to FIG. 3, at step 320, the interoperable transaction system 15 may transmit a cash dispense message. The interoperable transaction system 15 may transmit the cash dispense message to the ATM 22 or the termination message. The cash dispense message may cause the ATM 22 or the merchant POA device to dispense cash matching the withdrawal amount. The interoperable transaction system 15 may transmit the cash dispense message to the acquirer system 20. In response to receiving the cash dispense message, the acquirer system 20 may transmit the cash dispense message to the ATM 22 or the POS device of the participating merchant system. In response to receiving the cash dispense message, the ATM 22 or the POS device of the participating merchant system may dispense cash matching the withdrawal amount. The cash may be dispensed from the ATM 22 or the POS device of the participating merchant system in the currency that corresponds to the location of the ATM 22 or the POS device. The termination message may prevent the ATM 22 or the merchant POS device from dispensing cash matching the withdrawal amount. The interoperable transaction system 15 may transmit the termination message to the acquirer system 20. In response to receiving the termination message, the acquirer system 20 may transmit the termination message to the ATM 22 or the POS device of the participating merchant system. In response to receiving the termination message, the ATM 22 or the POS device of the participating merchant system does not dispense cash.

The method 300 described in FIG. 3 may be performed without the user presenting a payment device associated with the account of the user. Thus, the withdrawal initiation request and the withdrawal completion request may be initiated without the user presenting a payment device associated with the account of the user. Moreover, the method 300 may be performed in this way even when the issuer of the issuer system 14 authorizing the user's transaction (based on that issuer being the issuer of the user's payment device) is different from the issuer associated with the ATM 22, such that the system is interoperable.

Figure 6:
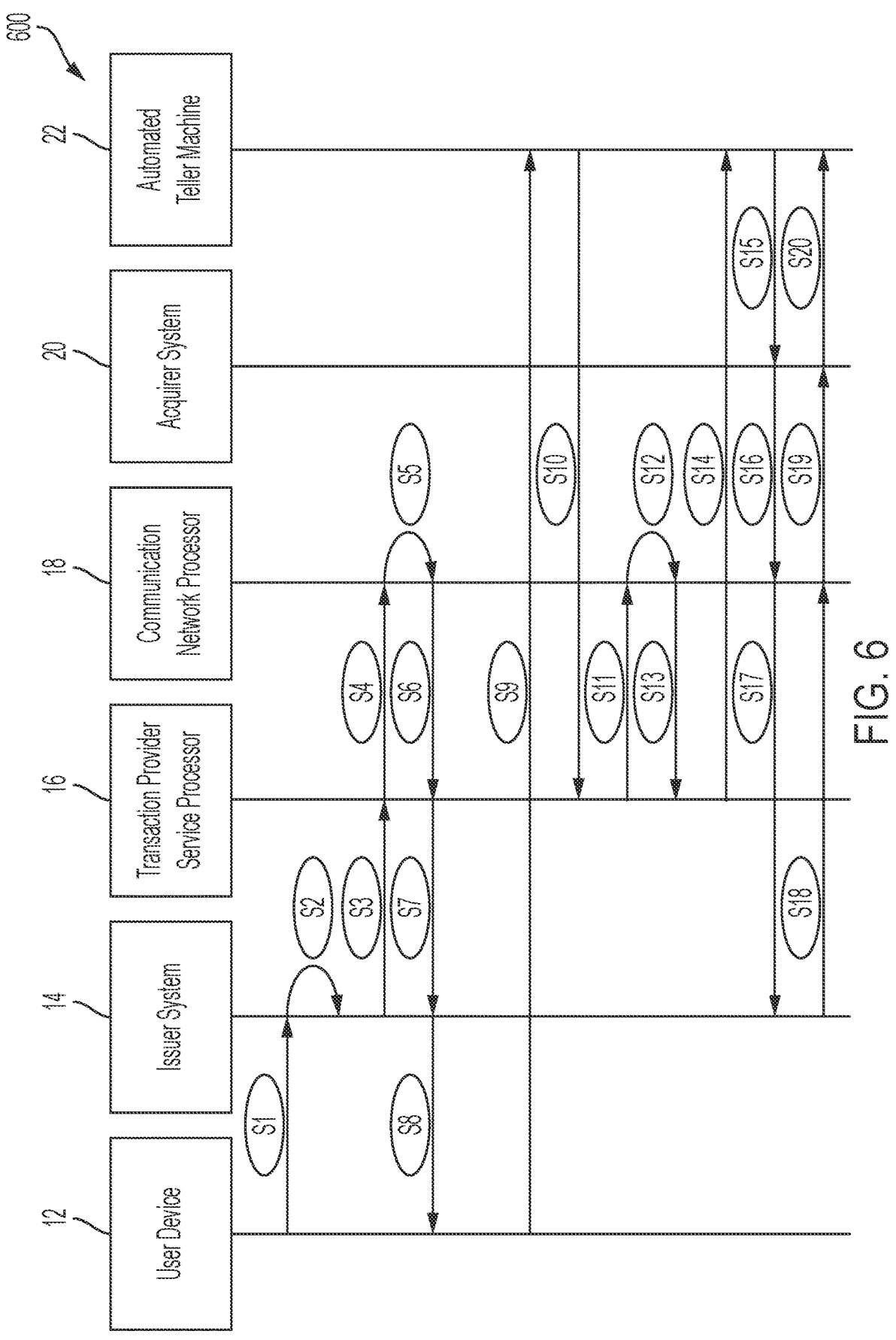
FIG. 6 shows a process flow diagram of a method for processing interoperable dispensing of funds initiated by a user, according to some non-limiting embodiments or aspects.

Referring to FIG. 6, a method 600 for automatically dispensing of funds, according to some non-limiting embodiments or aspects, is shown. For example, a user may initiate a cardless fund dispensing transaction at the ATM 22 or a POS device of a participating merchant system.

At step S1, the user device 12 may transmit a withdrawal request comprising a data field containing a withdrawal amount to the issuer system 14. The user may have an account associated with the issuer system 14, and the account may be associated with the issuer application 13. The user may initiate a cardless withdrawal initiation request by inputting a withdrawal amount in the user device 12. The user may indicate the account associated with the issuer system 14 for withdrawing the funds. The withdrawal amount may be inputted in the issuer application 13 of the user device 12 by the user.

At step S2, the issuer system 14 may retrieve the user identifier in response to receiving the withdrawal initiation request from the user device 12. The issuer system 14 may retrieve the user identifier associated with the user device 12 or the issuer application 13 and may additionally retrieve the user's account identifier.

At step S3, the issuer system 14 may generate the withdrawal initiation request and transmit the withdrawal initiation request to the transaction provider service processor 16. The withdrawal initiation request may be generated in response to the issuer system 14 retrieving the user identifier and/or account identifier associated with the user. The withdrawal initiation request may comprise at least one of the withdrawal amount, the user identifier, and/or the account identifier.

At step S4, the transaction provider service processor 16 may enroll and store the user identifier and/or the account identifier and the withdrawal amount of the withdrawal initiation request and transmit the withdrawal initiation request to the communication network processor 18.

At step S5, the communication network processor 18 may tokenize the account identifier, associate the tokenized account identifier with the user device 12 and/or the user identifier, and generate the authentication code.

At step S6, the communication network processor 18 may transmit the authentication code to the transaction provider service processor 16. The authentication code may cause the user device 12 or the issuer application 13 to display the authentication code on the user device 12.

At step S7, the transaction provider service processor 16 may transmit the authentication code to the issuer system 14.

At step S8, the issuer system 14 may transmit the authentication code to the user device 12. The user device 12 may display the authentication code to be seen by the user.

At step S9, the user may input the user identifier, withdrawal amount, and authentication code to the ATM 22 or a POS device of a participating merchant system. The user may select an option for withdrawing funds without presenting a physical payment device. The user may be the user associated with the user device 12 or a second user different from the user, and the second user may have received the authentication code, withdrawal amount, and user identifier from the user.

At step S10, the ATM 22 may generate and transmit the withdrawal completion request to the transaction provider service processor 16. The withdrawal completion request may comprise the authentication code, user identifier, and withdrawal amount that the user or the second user inputted to the ATM 22.

At step S11, the transaction provider service processor 16 may retrieve the enrolled and stored tokenized account identifier, as well as the associated user identifier, authentication code, and withdrawal amount of the withdrawal initiation request based on the withdrawal completion request and transmit the retrieved withdrawal initiation request and the withdrawal completion request to the communication network processor 18.

At step S12, the communication network processor 18 may validate the withdrawal completion request by matching the user identifier, the authentication code, and the withdrawal amount of the withdrawal initiation request and the user identifier, the authentication code, and the withdrawal amount of the withdrawal completion request. After validating the withdrawal completion request, the communication network processor 18 may generate a validation approval message.

At step S13, after validating the withdrawal completion request, the communication network processor 18 may transmit the validation approval message to the transaction provider service processor 16.

At step S14, the transaction provider service processor 16 transmits the validation approval message to the ATM 22. The validation approval message may comprise the tokenized or untokenized account identifier retrieved by the transaction provider service processor 16.

At step S15, the ATM 22 may generate and transmit the cash withdrawal message to the acquirer system 20 in response to receiving the validation approval message. The cash withdrawal message may comprise the authentication code, the withdrawal amount, and the tokenized account or untokenized identifier.

At step S16, the acquirer system 20 may transmit the cash withdrawal message to the communication network processor 18 in response to receiving the cash withdrawal message.

At step S17, the communication network processor 18 may transmit an authorization request to the issuer system 14. In response to receiving the cash withdrawal message from the acquirer system 20, the communication network processor 18 may detokenize the account identifier of the cash withdrawal message (if applicable). The communication network processor 18 may determine the issuer system 14 that corresponds with the account identifier. In some non-limiting embodiments or aspects, the determination of the issuer system 14 may have been completed at a prior step, such as at least one of steps S11-S13. After determining the issuer system 14, the communication network processor 18 may generate the authorization request and transmit the authorization request to the corresponding issuer system 14. The authorization request may comprise data fields containing the account identifier and the withdrawal amount.

At step S18, the issuer system 14 may generate and transmit the authorization response to the communication network processor 18 in response to receiving the authorization request. The authorization response may contain an indicator indicating whether the issuer system 14 determined that the transaction was authorized or declined.

At step S19, the communication network processor 18 may generate and transmit the cash dispense message to the acquirer system 20 in response to receiving the authorization response and based on the indicator indicating that the transaction was authorized. The cash dispense message may cause the ATM 22 to dispense the withdrawal amount to the user located at the ATM 22 or participating merchant POS device.

At step S20, the acquirer system 20 may transmit the authorization response to the ATM 22 in response to receiving the cash dispense message. The ATM 22 (or participating merchant POS device) may dispense funds in the amount of the withdrawal amount to the user.

Figure 7:
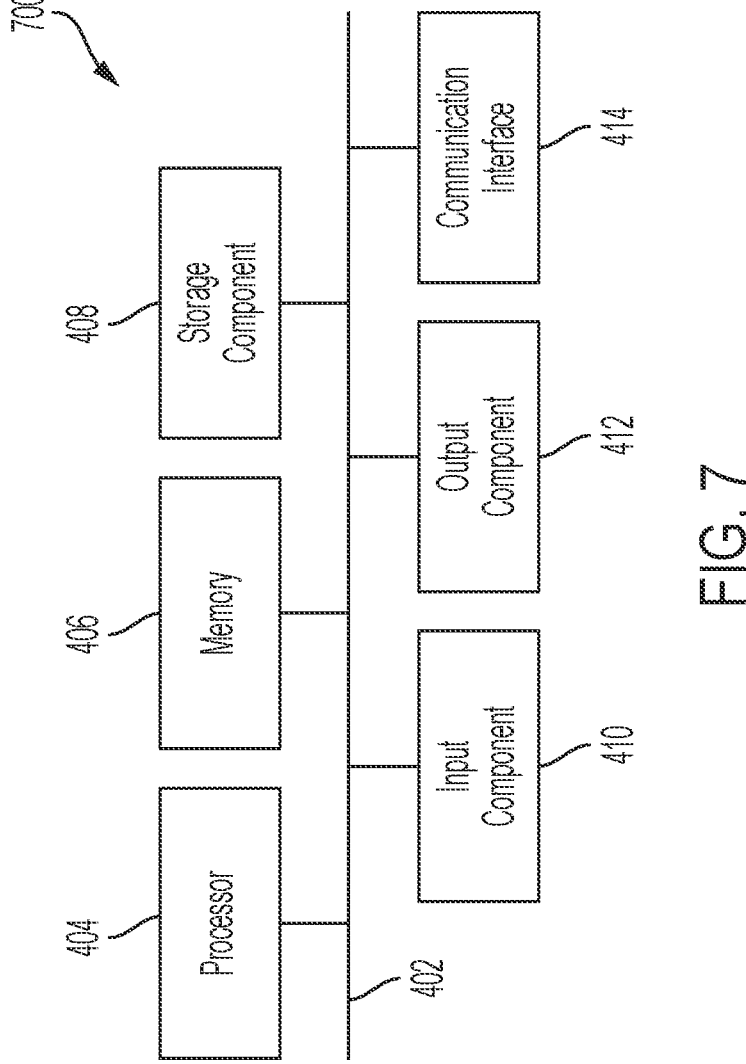
FIG. 7 shows a diagram of a non-limiting embodiment or aspect of components of one or more devices or systems of FIGS. 1, 2, and 4-6.

Referring to FIG. 7, FIG. 7 is a diagram of example components of a device 700. The device 700 may correspond to one or more of the systems shown in FIGS. 1 and 2. In some non-limiting embodiments or aspects, any of the devices shown in FIGS. 1, 2, and 4-6 (e.g., the user device 12) may include at least one device 700 and/or at least one component of device 700. As shown in FIG. 7, device 700 may include bus 402, processor 404, memory 406, storage component 408, input component 410, output component 412, and communication interface 414.

Bus 402 may include a component that permits communication among the components of device 700. In some non-limiting embodiments, processor 404 may be implemented in hardware, firmware, or a combination of hardware and software. For example, processor 104 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 406 may include random access memory (RAM), read only memory (ROM), and/or another type of dynamic or static storage device (e.g., flash memory, magnetic memory, optical memory, and/or the like) that stores information and/or instructions for use by processor 404.

Storage component 408 may store information and/or software related to the operation and use of device 700. For example, storage component 408 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 410 may include a component that permits device 700 to receive information, such as via user input (e.g., a touch screen display, a keyboard, a keypad, a mouse, a button, a switch, a microphone, a camera, and/or the like). Additionally or alternatively, input component 410 may include a sensor for sensing information (e.g., a global positioning system (GPS) component, an accelerometer, a gyroscope, an actuator, and/or the like). Output component 412 may include a component that provides output information from device 700 (e.g., a display, a speaker, one or more light-emitting diodes (LEDs), and/or the like).

Communication interface 414 may include a transceiver-like component (e.g., a transceiver, a receiver and transmitter that are separate, and/or the like) that enables device 700 to communicate with other devices, such as via a wired connection, a wireless connection, or a combination of wired and wireless connections. Communication interface 414 may permit device 700 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 700 may perform one or more processes described herein. Device 700 may perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 7 are provided as an example. In some non-limiting embodiments or aspects, device 700 may include additional components, fewer components, different components, or differently arranged components than those shown in FIG. 7. Additionally or alternatively, a set of components (e.g., one or more components) of device 700 may perform one or more functions described as being performed by another set of components of device 700.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
receiving, with an interoperable transaction system in communication with a plurality of issuer systems, a withdrawal initiation request generated by a user device of a user, the withdrawal initiation request comprising data fields containing a withdrawal amount and a user identifier associated with the user;
in response to receiving the withdrawal initiation request, generating, with the interoperable transaction system, an authentication code associated with the withdrawal initiation request;
in response to receiving the withdrawal initiation request, tokenizing, with the interoperable transaction system, an account identifier associated with an account of the user;
associating, with the interoperable transaction system, the tokenized account identifier with at least one of the user identifier and/or the account identifier;
transmitting, with the interoperable transaction system, the authentication code to cause the authentication code to be displayed by the user device;
receiving, with the interoperable transaction system, a withdrawal completion request comprising data fields containing the withdrawal amount, the user identifier, and the authentication code, the withdrawal completion request received from an automated teller machine (ATM) and/or a merchant point-of-sale (POS) device, the ATM and/or the merchant POS device associated with a first issuer system of the plurality of issuer systems;

in response to receiving the withdrawal completion request, retrieving, with the interoperable transaction system, the tokenized account identifier based on the user identifier from the withdrawal completion request;

validating, with the interoperable transaction system, the withdrawal completion request by matching the withdrawal amount, the user identifier, and the authentication code from the withdrawal completion request with the withdrawal amount and the user identifier from the withdrawal initiation request and the authentication code associated with the withdrawal initiation request;

in response to validating the withdrawal completion request, transmitting, with the interoperable transaction system, a validation approval message comprising the tokenized account identifier to the ATM and/or the merchant POS device;

receiving, with the interoperable transaction system and from the ATM and/or the merchant POS device, a withdrawal message comprising the tokenized account identifier, the authentication code, and the withdrawal amount;

in response to receiving the withdrawal message, identifying, with the interoperable transaction system, a second issuer system of the plurality of issuer systems, the second issuer system associated with the withdrawal message based on at least one of the withdrawal amount, the user identifier, and/or the authentication code, the second issuer system different from the first issuer system;

generating, with the interoperable transaction system, an authorization request comprising data fields containing the withdrawal amount and the account identifier, the authorization request generated by detokenizing the account identifier based on the tokenized account identifier and inserting the account identifier into a corresponding data field of the authorization request;

transmitting, with the interoperable transaction system, the authorization request to the second issuer system to cause the second issuer system to generate an authorization decision associated with the withdrawal message based on the account identifier;

receiving, with the interoperable transaction system, an authorization response comprising a data field containing the authorization decision comprising an indicator that the withdrawal message is authorized;

based on the indicator, transmitting, with the interoperable transaction system, a cash dispense message to the ATM and/or the merchant POS device; and in response to receiving the cash dispense message, automatically dispensing, with the ATM and/or the merchant POS device, the withdrawal amount.

2. The computer-implemented method of claim 1, wherein the withdrawal initiation request is generated by the user engaging with a mobile application of the second issuer system on the user device.

3. The computer-implemented method of claim 1, further comprising:

receiving, with at least one processor, a cash withdrawal message comprising the tokenized account identifier from an acquirer system, wherein the detokenizing of the account identifier occurs in response to receiving the cash withdrawal message from the acquirer system.

4. The computer-implemented method of claim 1, wherein the at least one processor comprises a transaction service provider processor.

5. The computer-implemented method of claim 1, wherein the withdrawal completion request is received by at least one processor in response to a second user inputting the user identifier, the authentication code, and the withdrawal amount into the ATM and/or the merchant POS device, and wherein the withdrawal amount is dispensed to the second user.

6. The computer-implemented method of claim 1, wherein the cash dispense message causes the ATM and/or the merchant POS device to dispense the withdrawal amount in a second country different from a first country in which the withdrawal initiation request was initiated, and wherein the withdrawal amount is dispensed in a currency corresponding to the second country.

7. The computer-implemented method of claim 1, wherein a unique authentication code is generated for each withdrawal initiation request generated by the user.

8. The computer-implemented method of claim 1, wherein the withdrawal initiation request and the withdrawal completion request are initiated without the user presenting a payment device associated with the account of the user.

9. A system comprising an interoperable transaction system in communication with a plurality of issuer systems, the interoperable transaction system programmed or configured to:

receive a withdrawal initiation request generated by a user device of a user, the withdrawal initiation request comprising data fields containing a withdrawal amount and a user identifier associated with the user;

in response to receiving the withdrawal initiation request, generate an authentication code associated with the withdrawal initiation request;

in response to receiving the withdrawal initiation request, tokenize an account identifier associated with an account of the user;

associate the tokenized account identifier with at least one of the user identifier and/or the account identifier;

transmit the authentication code to cause the authentication code to be displayed by the user device;

receive a withdrawal completion request comprising data fields containing the withdrawal amount, the user identifier, and the authentication code, the withdrawal completion request received from an automated teller machine (ATM) and/or a merchant point-of-sale (POS) device, the ATM and/or the merchant POS device associated with a first issuer system of the plurality of issuer systems;

in response to receiving the withdrawal completion request, retrieve the tokenized account identifier based on the user identifier from the withdrawal completion request;

validate the withdrawal completion request by matching the withdrawal amount, the user identifier, and the authentication code from the withdrawal completion request with the withdrawal amount and the user identifier from the withdrawal initiation request and the authentication code associated with the withdrawal initiation request;

in response to validating the withdrawal completion request, transmit a validation approval message comprising the tokenized account identifier to the ATM and/or the merchant POS device;

receive, from the ATM and/or the merchant POS device, a withdrawal message comprising the tokenized account identifier, the authentication code, and the withdrawal amount;

in response to receiving the withdrawal message, identify a second issuer system of the plurality of issuer systems, the second issuer system associated with the withdrawal message based on at least one of the withdrawal amount, the user identifier, and/or the authentication code, the second issuer system different from the first issuer system;

generate an authorization request comprising data fields containing the withdrawal amount and the account identifier, the authorization request generated by detokenizing the account identifier based on the tokenized account identifier and inserting the account identifier into a corresponding data field of the authorization request;

transmit the authorization request to the second issuer system to cause the second issuer system to generate an authorization decision associated with the withdrawal message based on the account identifier;

receive an authorization response comprising a data field containing the authorization decision comprising an indicator that the withdrawal message is authorized; and based on the indicator, transmit a cash dispense message to the ATM and/or the merchant POS device;

the system comprising the ATM and/or the merchant POS device configured to automatically dispense the withdrawal amount in response to receiving the cash dispense message.

10. The system of claim 9, wherein the withdrawal initiation request is generated by the user engaging with a mobile application of the second issuer system on the user device.

11. The system of claim 9, wherein the at least one processor is further programmed or configured to:

receive a cash withdrawal message comprising the tokenized account identifier from an acquirer system, wherein the detokenizing the account identifier occurs in response to receiving the cash withdrawal message from the acquirer system.

12. The system of claim 9, wherein the at least one processor comprises a transaction service provider processor.

13. The system of claim 9, wherein the withdrawal completion request is received in response to a second user inputting the user identifier, the authentication code, and the withdrawal amount into the ATM and/or the merchant POS device, wherein the withdrawal amount is dispensed to the second user.

14. The system of claim 9, wherein the cash dispense message causes the ATM and/or the merchant POS device to dispense the withdrawal amount in a second country different from a first country in which the withdrawal initiation request was initiated, wherein the withdrawal amount is dispensed in a currency corresponding to the second country.

15. A computer program product comprising at least one non-transitory computer-readable medium including one or more instructions that, when executed by an interoperable transaction system in communication with a plurality of issuer systems, cause the interoperable transaction system to:

receive a withdrawal initiation request generated by a user device of a user, the withdrawal initiation request comprising data fields containing a withdrawal amount and a user identifier associated with the user;

in response to receiving the withdrawal initiation request, generate an authentication code associated with the withdrawal initiation request;

in response to receiving the withdrawal initiation request, tokenize an account identifier associated with an account of the user;

associate the tokenized account identifier with at least one of the user identifier and/or the account identifier;

transmit the authentication code to cause the authentication code to be displayed by the user device;

receive a withdrawal completion request comprising data fields containing the withdrawal amount, the user identifier, and the authentication code, the withdrawal completion request received from an automated teller machine (ATM) and/or a merchant point-of-sale (POS) device, the ATM and/or the merchant POS device associated with a first issuer system of the plurality of issuer systems;

in response to receiving the withdrawal completion request, retrieve the tokenized account identifier based on the user identifier from the withdrawal completion request;

validate the withdrawal completion request by matching the withdrawal amount, the user identifier, and the authentication code from the withdrawal completion request with the withdrawal amount and the user identifier from the withdrawal initiation request and the authentication code associated with the withdrawal initiation request;

in response to validating the withdrawal completion request, transmitting, with the interoperable transaction system, a validation approval message comprising the tokenized account identifier to the ATM and/or the merchant POS device;

receive, from the ATM and/or the merchant POS device, a withdrawal message comprising the tokenized account identifier, the authentication code, and the withdrawal amount;

in response to receiving the withdrawal message, identify a second issuer system of the plurality of issuer systems, the second issuer system associated with the withdrawal message based on at least one of the withdrawal amount, the user identifier, and/or the authentication code, the second issuer system different from the first issuer system;

generate an authorization request comprising data fields containing the withdrawal amount and the account identifier, the authorization request generated by detokenizing the account identifier based on the tokenized account identifier and inserting the account identifier into a corresponding data field of the authorization request;

transmit the authorization request to the second issuer system to cause the second issuer system to generate an authorization decision associated with the withdrawal message based on the account identifier;

receive an authorization response comprising a data field containing the authorization decision comprising an indicator that the withdrawal message is authorized;

based on the indicator, transmit a cash dispense message to the ATM and/or the merchant POS device; and in response to receiving the cash dispense message, automatically dispense, with the ATM and/or the merchant POS device, the withdrawal amount.

* * * * *